United States Patent
Weiland et al.

(10) Patent No.: US 10,234,478 B2
(45) Date of Patent: Mar. 19, 2019

(54) METHOD FOR DETECTING A MALFUNCTION OF A SENSOR OF A VEHICLE SAFETY DEVICE

(71) Applicant: TRW Automotive GmbH, Alfdorf (DE)

(72) Inventors: Dominik Weiland, Radolfzell (DE); Paul Melton, White Lake, MI (US); Carl A. Munch, Troy, MI (US); Oliver Buntz, Bodman-Ludwigshafen (DE); Matthias Webert, Galenhofen (DE)

(73) Assignee: TRW AUTOMOTIVE GmbH (DE)

( * ) Notice: Subject to any disclaimer, the term of this patent is extended or adjusted under 35 U.S.C. 154(b) by 54 days.

(21) Appl. No.: 15/438,846

(22) Filed: Feb. 22, 2017

(65) Prior Publication Data
US 2017/0269121 A1 Sep. 21, 2017

(30) Foreign Application Priority Data
Mar. 17, 2016 (DE) .................. 10 2016 105 016

(51) Int. Cl.
*G01P 21/00* (2006.01)
*B60R 21/0132* (2006.01)
(Continued)

(52) U.S. Cl.
CPC .......... *G01P 21/00* (2013.01); *B60R 21/0132* (2013.01); *B60W 50/0205* (2013.01);
(Continued)

(58) Field of Classification Search
None
See application file for complete search history.

(56) References Cited

U.S. PATENT DOCUMENTS 6,298,709 B1   10/2001   Artzner et al.
6,840,106 B1*  1/2005    McNeil ................. G01P 15/125
                                                         73/514.32
(Continued)

FOREIGN PATENT DOCUMENTS

DE         19924369         11/2000

*Primary Examiner* — Paul M. West
*Assistant Examiner* — Mark A Shabman
(74) *Attorney, Agent, or Firm* — Tarolli, Sundheim, Covell & Tummino LLP

(57) ABSTRACT

A method for detecting a malfunction or defect of a sensor of a vehicle safety device uses a control unit of the vehicle safety device and at least one self-testing sensor which is separate from the control unit and transmits measuring values to the control unit. The following steps are performed:
a) The sensor performs the self-test of the sensor, wherein the measuring section of the sensor is activated in a simulated manner in order to generate a test measuring value in response to the simulated activation,
b) a signal is transmitted to the control unit which includes at least one of: a ratio of test measuring value to intensity of the simulated activation, a deviation of the test measuring value from the simulated activation and a test measuring value,
c) it is checked by means of the control unit whether at least one of the ratio, the deviation and the measuring value is plausible,
d) the control unit determines that the sensor has malfunctioned or is defective if at least one on the ratio, the deviation and the test measuring value is considered to be non-plausible.

8 Claims, 2 Drawing Sheets

(51) Int. Cl.
  *B60W 50/02*   (2012.01)
  *B60R 21/01*   (2006.01)
(52) U.S. Cl.
  CPC ............... *B60R 2021/0119* (2013.01); *B60R 2021/01327* (2013.01); *B60W 2050/021* (2013.01)

(56) References Cited

U.S. PATENT DOCUMENTS

| | | |
|---|---|---|
| 2004/0194532 A1 | 10/2004 | Lally et al. |
| 2010/0251800 A1* | 10/2010 | Mueck ............... G01P 15/125 73/1.38 |
| 2013/0125651 A1 | 5/2013 | Morningstar et al. |

\* cited by examiner

METHOD FOR DETECTING A MALFUNCTION OF A SENSOR OF A VEHICLE SAFETY DEVICE

RELATED APPLICATION

This application claims priority from German Patent Application No. 10 2016 105 016.4, filed Mar. 17, 2016, the subject matter of which is incorporated herein by reference.

TECHNICAL FIELD

The invention relates to a method for detecting a malfunction of a sensor of a vehicle safety device.

BACKGROUND OF THE INVENTION

In vehicle safety technology, data regarding the current driving situation of the vehicle is collected using sensors. This data is made available to the vehicle safety devices, e.g. airbag systems or vehicle dynamics control, such as ESP or ESC which can control the vehicle or parts thereof using this data.

The measuring section of these sensors is e.g. a microsystem such as a micro-electro-mechanical system (MEMS element) or a micro-opto-electro-mechanical system (MOEMS element).

If one of these sensors malfunctions or supplies false measuring values owing to a defect, the measuring values of this malfunctioning sensor must be replaced with other measuring values or at least be approximated so that the vehicle safety devices can continue to work as intended. However, in this respect, it must be possible to detect with certainty whether a sensor has malfunctioned or is defective in order for the safety device to resort to the replacement values in that case. If false measuring values are not detected or a defect-free sensor is classified as being defective, the vehicle safety devices may operate in an erroneous or suboptimum manner.

Methods for detecting whether a malfunction or defect of a sensor has occurred are known and are already carried out within the sensor, i.e. the structural unit consisting of the measuring section and the sensor controller, which together form the integrated sensor, and output a logical value indicating whether or not the sensor is operating without malfunctions.

FIG. 1 schematically illustrates a known vehicle safety device 110 having a self-testing sensor 112 and a control unit 114. In order for the sensor to perform a self-test, a sensor controller (not shown) which is part of the sensor 112 activates the measuring section (not shown) of the sensor 112 in a first step I and thereby generates a test measuring value in response to the simulated activation. This test measuring value is then evaluated by the sensor controller in step II which finally generates the logical value or error marker in step III, indicating whether or not the sensor 112 is operating without malfunctions. The error marker is then transmitted from the sensor 112 to the control unit 114 of the vehicle safety device 110 (step IV). This type of self-test can be performed continuously.

However, the malfunction detection of these self-testing sensors is not precise enough in some conditions.

It is therefore the object of the present invention to improve the accuracy of a method for recognising a malfunction or defect of a self-testing sensor of a vehicle safety device.

BRIEF SUMMARY OF THE INVENTION

The object is achieved by a method for detecting a malfunction or defect of a sensor of a vehicle safety device by means of a control unit of the vehicle safety device and at least one self-testing sensor which is separate from the control unit and transmits measuring values to the control unit, comprising the following steps:
  a) performing the self-test of the sensor, wherein the measuring section of the sensor is activated in a simulated manner in order to generate a test measuring value in response to the simulated activation,
  b) transmitting a signal to the control unit which includes the ratio of test measuring value to intensity of the simulated activation, the deviation of the test measuring value from the simulated activation and/or the test measuring value,
  c) checking, by means of the control unit, whether the ratio, deviation and/or test measuring value is plausible,
  d) determining that the sensor has malfunctioned or is defective if the ratio, deviation and/or test measuring value is/are considered by the control unit to be non-plausible.

A self-testing sensor in the sense of the invention comprises a sensor controller, i.e. a control unit of its own and separate from the control unit of the vehicle safety device. The sensor controller is, for example, able to stimulate a measuring section of the sensor.

The invention is based on the knowledge that the measuring results of the self-test of the self-testing sensor can also be directly used in order to detect whether or not the sensor has malfunctioned even though the self-testing sensor has already output an error marker, by means of which the sensor is classified as being functional or defective. Thus, the control unit of the vehicle safety device does not rely on the error marker of the self-testing sensor but it receives measurement results of the self test from the self-testing sensor.

This allows the method for detecting a malfunction or defect of the sensor to be adapted more precisely to the respective use in a vehicle safety device, e.g. adapting the method to specific driving situations of the vehicle. The conditions as to when the ratio, deviation and/or test measuring value are no longer plausible or are considered to be non-plausible by the control unit, are predetermined and are stored in the control unit. In this manner, the number of false reports regarding the malfunction or defect of the sensor can be considerably reduced and true errors can be detected in a quicker and more reliable manner.

Preferably, the sensor comprises an MEMS element and/or an MOEMS element which includes the measuring section so that the activation of the MEMS or MOEMS element makes it possible to detect whether the measuring section has malfunctioned or is defective.

For example, the sensor is an acceleration sensor so that the functionality of an acceleration sensor incorporated in the vehicle safety device can easily be checked.

The sensor can generate the simulated activation itself, whereby the vehicle safety device does not have to have components which can activate the sensor or measuring section in a simulated manner. As a result, the vehicle safety device can be produced in a simpler and more cost effective manner.

For example, in the case of an acceleration sensor, a sensor controller integrated in the sensor can apply an alternating voltage with a test frequency to measuring electrodes of the measuring section, which causes the measuring electrodes to vibrate, i.e. it activates them. The measuring section then generates a test measuring value with the frequency of this vibration.

Preferably, the signal is supplied to an integrator for checking the plausibility in the control unit, wherein the ratio, deviation and/or test measuring value is considered by the control unit to be non-plausible when the output value of the integrator passes a predetermined threshold. In this manner, short-term large modifications of the test measuring value are taken into consideration but without them immediately resulting in the sensor being detected as malfunctioning or being defective. Therefore, the method is robust against short-term deflection, which results in a reduction in the number of false classifications.

In one embodiment of the invention, the signal in the control unit initially passes through a low-pass filter before it is supplied to the integrator so that, for the purposes of measurement, irrelevant high frequencies, e.g. noise, are not considered in the measurement. As a result, the accuracy of the classification is further increased.

In one embodiment of the invention, the control unit counts how often the ratio, deviation and/or test measuring value falls below or exceeds a predetermined threshold, wherein the ratio, deviation and/or test measuring value is considered by the control unit to be non-plausible when the number determined by the control unit in a predetermined time interval is higher than a predetermined maximum value. As a result, it is possible to determine, in a simple manner, the malfunction or a defect of the sensor without a classification as a malfunction or defect immediately occurring as soon as the variable has exceeded or fallen below the threshold only a few times. This method can be used as an alternative or supplement to the method using an integrator.

Whether those events in which the ratio, deviation and/or test measuring value are below or above the threshold are counted depends upon the variables being considered. For example, when considering the deviation, those events in which the deviation is above a predetermined threshold are counted.

In one embodiment variation of the invention, the simulated activation of the measuring section of the sensor is performed in at least two ways, e.g. by activation using two test frequencies, and for each type of activation a signal is transmitted to the control unit, said signal including the ratio of test measuring value to intensity of the simulated activation of the corresponding type, the deviation of the test measuring value from the simulated activation of the corresponding type and/or the test measuring value for the corresponding type of activation, wherein the control unit checks, in relation to each type of activation, whether the ratio, deviation and/or test measuring value is plausible, and wherein the control unit determines that the sensor is malfunctioning when the ratio, deviation and/or test measuring value for each type of activation or test frequency is considered by the control unit to be non-plausible and in addition the product of the individual signals of the corresponding types of activation or test frequencies is positive. In this manner, an extremely robust and at the same time precise method for detecting malfunctions or defects is achieved because random fluctuations in one type of activation or at a partial frequency do not cause a false classification and moreover random fluctuations in the two types or at the two test frequencies, which generate opposite deflections, likewise do not result in a false classification. The recognition is based on the fact that in the case of a real malfunction or defect, the deflection in the two types of excitation or the two test frequencies used is always identical. For example, the simulated activation takes place at precisely two test frequencies.

In one embodiment of the invention, the vehicle safety device is an airbag system and/or vehicle dynamics control so that the operating safety of these systems can be increased.

DETAILED DESCRIPTION OF THE PREFERRED EMBODIMENT

Figure 1:
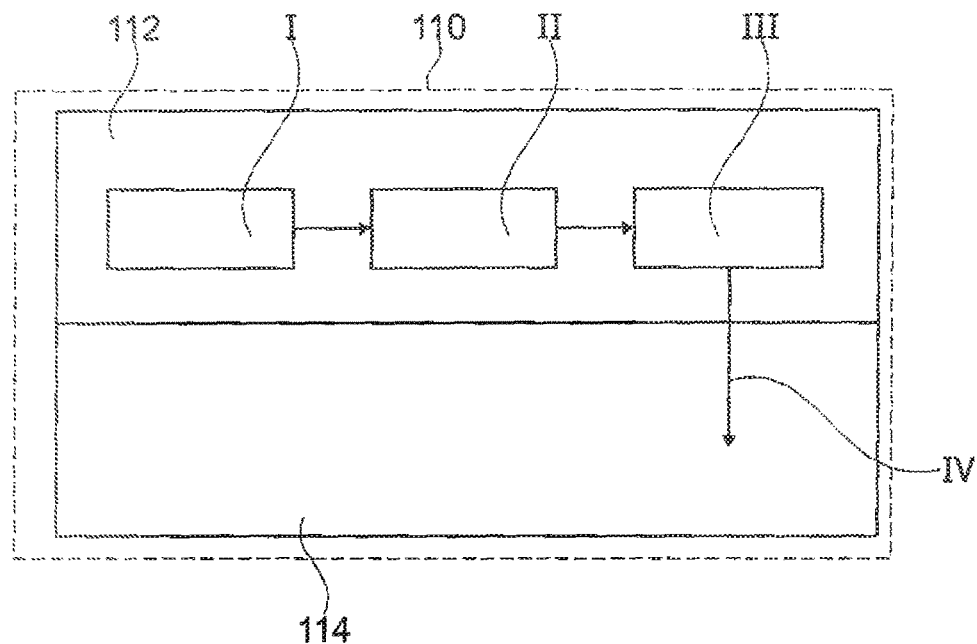
FIG. 1 schematically shows a method for detecting a malfunction or defect of a sensor from the prior art.
Figure 2:
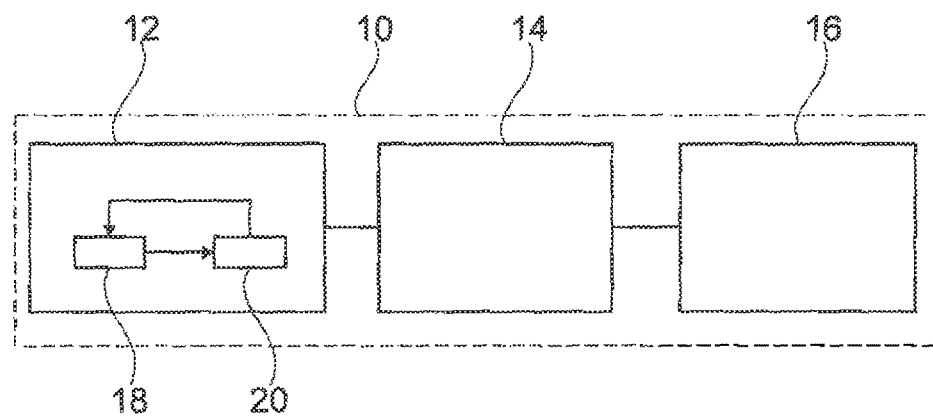
FIG. 2 shows a schematic diagram of the different components for performing the method in accordance with the invention, FIG. 3 schematically shows a block diagram of the method in accordance with the invention for detecting a malfunction or a defect of a sensor.

FIG. 2 schematically illustrates a vehicle safety device 10 which includes a self-testing sensor 12, a control unit 14 and a safety component 16.

The vehicle safety device 10 is, for example, an airbag system or vehicle dynamic control, also referred to as ESP, ESC etc. In that case, the safety component 16 is, for example, an airbag or a brake accordingly.

The control unit 14 controls the vehicle safety device 10 and thus the safety component 16. Also, the control unit 14 can be integrated in a central control unit of the vehicle.

The sensor 12 comprises a measuring section 18 and a sensor controller 20 which are electrically connected to each other. The measuring section 18 and the sensor controller 20 are located within the sensor 12, which is installed as a finished unit.

The measuring section 18 is a microsystem, such as a micro-electro-mechanical system (MEMS) or a micro-opto-electro-mechanical system (MOEMS) and is used to capture a particular measuring value.

For example, the sensor 12 is an acceleration sensor of a vehicle. In this case, the measuring section 18 is designed as a MEMS element which generates a signal in dependence upon the occurring acceleration. In this respect, mobile measuring electrodes are used for example, which generate a measuring value in dependence upon their deflection.

The sensor 12 can be arranged such that it can measure the longitudinal acceleration, the transverse acceleration or the acceleration of the vehicle about its vertical axis. Typically, a sensor 12 is provided for measuring the acceleration in each of these directions.

The sensor controller 20 controls the measuring section 18, receives the signals of the measuring section 18 and forwards the determined measuring value to the control unit 14 of the vehicle safety device 10.

The control unit 14 of the vehicle safety device 10 is separate from the sensor 12 and thus from the sensor controller 20.

The sensor 12 is designed as a self-testing sensor, i.e. the sensor controller 20 can activate the measuring section 18 in a simulated manner. By way of this simulated activation, the measuring section 18 generates a test measuring value which is measured by the sensor controller 20 (step A). The activation can be performed in various ways.

For example, in the case of an acceleration sensor, the sensor controller 20 can apply an alternating voltage with one or more test frequencies to the measuring electrodes of the measuring section 18, these test frequencies causing the measuring electrodes to vibrate, i.e. be activated in various ways. The measuring section 18 then generates test measuring values with the frequency of these vibrations.

The sensor controller 20 can determine, using the test measuring value and the information relating thereto, how greatly it has activated the measuring section 18 in a simulated manner, the ratio of test measuring value to intensity of the simulated activation and/or the deviation of the test measuring value from the simulated activation.

Figure 3:
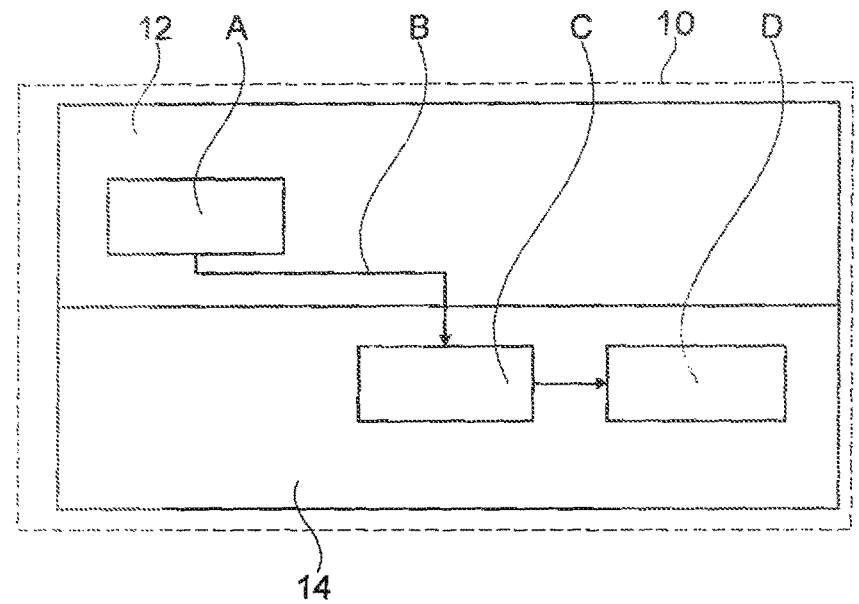
Figure 4:
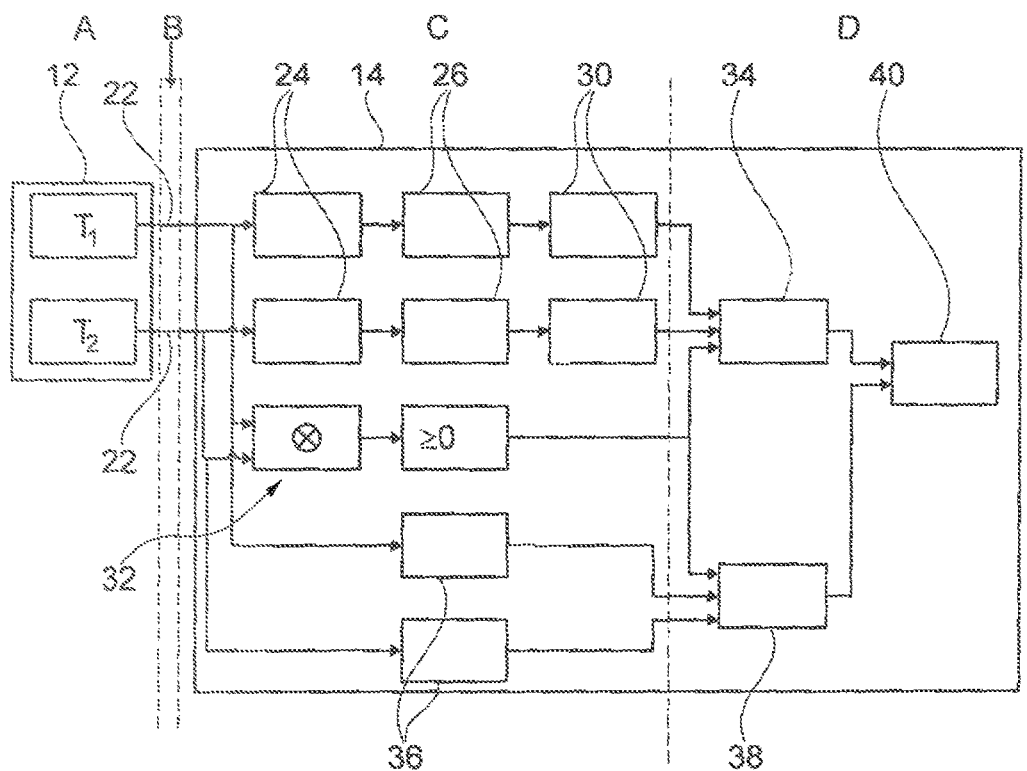
FIG. 4 shows a flowchart for implementing the method in accordance with the invention.

As can be seen in FIGS. 3 and 4, a signal 22 is transmitted from the sensor 12, or to be more precise from the sensor controller 20, to the control unit 14 of the vehicle safety device 10 (step B).

The signal 22 includes the ratio of test measuring value to intensity of the simulated activation, the deviation of the test measuring value from the simulated activation and/or the test measuring value itself. In the drawings, these three items of information are designated together with the reference sign T, wherein reference sign T indicates an individual item of these items of information or any combination of these items of information.

The signal 22 with the ratio, deviation and/or test measuring value T is received by the control unit 14 and is checked for plausibility (step C). If the plausibility check by the control unit 14 shows that the ratio, deviation and/or test measuring value are non-plausible, then the control unit 14 determines that the sensor has malfunctioned or is defective (step D).

If the sensor 12 has been classified as having malfunctioned or as being defective, the control unit 14 no longer uses the measuring value of this sensor 12 to control the safety components 16 but rather relies on replacement measuring values. However, if it is determined that the sensor has not malfunctioned or is not defective, the measuring value of this sensor 12 is used, as usual, by the control unit 14 to control the safety components 16.

In the process illustrated in FIG. 4 for determining whether the ratio, deviation and/or test measuring value T is plausible, initially two different ratios, deviations and/or test measuring values T1, T2 are generated by the sensor 12.

This occurs by virtue of the fact that the sensor controller 20 influences the measuring section 18 with two different types of simulated activation, e.g. in the event that the sensor 12 is an acceleration sensor, this is activated by the sensor controller 20 with electrical signals 22 of different test frequencies.

The sensor controller 20 thus receives two different test measuring values and determines, on the basis of the different test measuring values, separately for each type of activation, e.g. for each test frequency, the deviation of the test measuring value from the simulated activation and/or the ratio of test measuring value to intensity of the simulated activation.

For each type of activation, e.g. for each test frequency, a signal 22 is transmitted by the sensor controller 20 to the control unit 14, which signal includes the ratio of test measuring value to intensity of the simulated activation, the deviation of the test measuring value from the simulated activation and/or the test measuring value for this type of activation T1, T2. For example, the sensor controller 20 outputs the deviation of the test measuring value from the simulated activation as a percentage in the range of −100% to +100%.

These signals 22 are received by the control unit 14 and initially checked for plausibility individually.

The check for plausibility is the same for each signal 22 and therefore the check will only be described once hereinafter.

Furthermore, in the embodiment shown in FIG. 4, two checking methods are performed for checking the plausibility of each signal 22, i.e. for each type of activation, which methods will be discussed separately hereinafter.

In the first checking method, the signal 22 initially passes through a low-pass filter 24 in order to remove undesired noise from the signal 22.

Then, the signal 22 is supplied to an integrator 26.

The integrator 26 sums the signal 22 and outputs an integrated signal as an output value 28. The output value corresponds, for example, to a signal 22 integrated over 2000 ms.

The signal is then compared with a predetermined threshold Si, e.g. 40000 (reference sign 30) and is considered to be non-plausible when the output value 28 has passed the threshold Si. "Pass" is intended to mean that the output value 28 has exceeded the threshold Si when the desired value of the output value 28 lies below the threshold Si, and that the output value 28 falls below the threshold Si when the desired value of the output value 28 lies above the threshold Si.

In this manner, a check is made as to whether one of the signals 22 or the ratio, deviation or test measuring value for one type of activation (T1 or T2), e.g. for one test frequency, is plausible.

The same method is also performed with the other signal 22 of the other type of activation, e.g. of the other test frequency. Therefore, for each type of activation, in this case test frequencies, the ratio, deviation or the test measuring value T1 and T2 are checked as to plausibility.

In addition, the two signals 22 are multiplied together and a check is made as to whether the result is positive (step 32).

The control unit 14 now determines that the sensor has malfunctioned or is defective when the checking method has determined that the ratio, deviation and/or test measuring value T1 and T2 for each type of activation, e.g. for each test frequency, is non-plausible and additionally the product of the individual signals 22 for the individual types of activation, e.g. for the different test frequencies, is positive (step 34).

In the second checking method used in the embodiment of FIG. 4, the signals 22 are each supplied to a counting unit 36 of the control unit 14. This counts how often the ratio, deviation and/or test measuring value T1 or T2 falls below or exceeds a predetermined threshold Sz. Whether the times the variable falls below or exceeds the threshold Sz are counted depends upon the type and the desired value of the variable being considered.

For example, the threshold Sz for the absolute deviation of the test measuring value from the intensity of the simulated activation is at 60%, wherein the number of times this threshold Sz is exceeded is counted.

If now the variable is counted as exceeding or falling below the threshold Sz a greater number of times than a predetermined maximum value, e.g. 60, within a predetermined time interval, e.g. 2 seconds, or directly one after the ether, then the ratio, deviation and/or test measuring value T1 or T2 is considered by the control unit 14 to be non-plausible.

As in the first checking method, in this checking method the control unit 14 determines that the sensor 12 has malfunctioned or is defective when the ratio, deviation and/or test measuring value T1, T2 for each type of activation, e.g.

for each test frequency, is non-plausible and in addition the product determined in step 32 is positive (step 38).

If the two checking methods are used simultaneously, it is sufficient for a determination to be made in one of the checking methods (step 34 or step 38) that the sensor has malfunctioned or is defective, in order for the control unit 14 to classify the sensor 12 as being faulty and for the measuring values of this sensor 12 to no longer be used to control the safety components 16 (step 40).

Of course, it is possible that the sensor 12 generates more than two signals 22 for different types of activation and transmits same to the control unit 14 which proceeds as per the embodiment of FIG. 4.

Likewise, it is feasible for the sensor 12 to generate only one signal 22 corresponding to one type of activation. In this case, the method shown in FIG. 4 is simplified because there is no need to multiply the signals 22 (step 32).

It is also feasible for only one of the two checking methods shown in FIG. 4 to be used in each case, in order to reduce the complexity of the method.

The invention claimed is:

1. A method for detecting a malfunction or defect of a sensor of a vehicle safety device by means of a control unit of said vehicle safety device, the method comprising:
   a) using a controller of the sensor to perform a self-test of the sensor by activating a measuring section of the sensor in order to generate a test measuring value in response to the activation,
   b) transmitting a signal from the controller of the sensor to the control unit of the vehicle safety device, the signal including at least one of a ratio of the test measuring value to intensity of the activation, a deviation of said test measuring value from said simulated activation and a test measuring value,
   c) checking, by means of the control unit of the vehicle safety device, whether at least one of said ratio, said deviation and said test measuring value is plausible,
   d) determining that said sensor has malfunctioned or is defective if at least one of said ratio, said deviation and said test measuring value is considered by the control unit of the vehicle safety device to be non-plausible.

2. Method as claimed in claim 1, wherein said sensor comprises one of an MEMS element and an MOEMS element which includes said measuring section.

3. Method as claimed in claim 1, wherein said sensor is an acceleration sensor which measures in particular one of a longitudinal acceleration, a transverse acceleration and an acceleration about a vertical axis of said vehicle.

4. Method as claimed in claim 1, wherein said signal is supplied to an integrator to generate an output value for checking plausibility in the control unit of the vehicle safety device, wherein at least one of said ratio, said deviation and said test measuring value is considered by the control unit of the vehicle safety device to be non-plausible when said output value of said integrator passes a predetermined threshold.

5. Method as claimed in claim 4, wherein said signal in said control unit initially passes through a low-pass filter before it is supplied to said integrator.

6. Method as claimed in claim 1, wherein said control unit counts how often at least one of said ratio, said deviation and said test measuring value falls below or exceeds a predetermined threshold, wherein at least one of said ratio, said deviation and said test measuring value is considered by said control unit to be non-plausible when said number determined by said control unit in a predetermined time interval is higher than a predetermined maximum value.

7. Method as claimed in claim 1, wherein said activation of said measuring section of said sensor is performed at at least two test frequencies, and
   for each test frequency a signal is transmitted from the controller of the sensor to the control unit of the vehicle safety device, said signal including at least one of said ratio of test measuring value to intensity of said activation of said corresponding frequency, said deviation of said test measuring value from said activation of said corresponding frequency and said test measuring value,
   wherein the control unit of the vehicle safety device checks, in relation to each frequency, whether at least one of said ratio, said deviation and said simulated activation test measuring value is plausible,
   and wherein the control unit of the vehicle safety device determines that said sensor has malfunctioned or is defective when at least one of said ratio, said deviation and said test measuring value for each frequency is considered by said control unit to be non-plausible and in addition said product of said individual signals of said corresponding frequencies is positive.

8. Method as claimed in claim 1, wherein said vehicle safety device is at least one of an airbag system and a vehicle dynamics control.

* * * * *